United States Patent [19]
Pickering

[11] Patent Number: 5,960,442
[45] Date of Patent: Sep. 28, 1999

[54] REAL-TIME INTERACTIVE DIRECTORY

[75] Inventor: Richard B. Pickering, El Granada, Calif.

[73] Assignee: Genesys Telecommunications Laboratories, Inc., San Francisco, Calif.

[21] Appl. No.: 08/969,118

[22] Filed: Nov. 12, 1997

[51] Int. Cl.⁶ ........................................... G06F 17/30
[52] U.S. Cl. .................... 707/104; 707/200; 379/201; 379/242; 379/265; 379/266; 345/326; 345/329; 345/330
[58] Field of Search .................. 707/104, 200; 379/201, 242, 265, 266; 345/326, 329, 330

[56] References Cited

U.S. PATENT DOCUMENTS

| | | | |
|---|---|---|---|
| 5,467,391 | 11/1995 | Donaghue, Jr. et al. | 379/265 |
| 5,642,410 | 6/1997 | Walsh et al. | 379/201 |
| 5,696,809 | 12/1997 | Voit | 379/5 |
| 5,757,904 | 5/1998 | Anderson | 379/265 |
| 5,784,451 | 7/1998 | Smith, Jr. | 379/265 |
| 5,848,131 | 12/1998 | Shaffer et al. | 379/88.2 |
| 5,870,464 | 2/1999 | Brewster et al. | 379/219 |

*Primary Examiner*—Paul R. Lintz
*Attorney, Agent, or Firm*—Donald R. Boys

[57] ABSTRACT

An interactive directory provided for a workstation having a connected video monitor and adapted for network access has an interactive display for displaying status for individual entities, being persons and organizations. Entities are listed in the display along with status for each entity. There may be multiple fields for status, and some fields display telephone numbers, while others may provide alphanumeric display. A remote access contact address is stored and associated with each directory entity, and when the directory is active, the workstation accesses status information from network sources associated with individual directory listings. Status for entities in the directory is therefore updated in real time as the directory is used. In some embodiments multiple graphic indicia, such as underlining, shading, font choice and the like are used to provided status indication in various fields of the interactive display. In some embodiments alpha-numeric status is provided as well. In other embodiments telephone calls may be placed by interactive input to the directory.

36 Claims, 2 Drawing Sheets

| | 1 | 2 | 3 | 4 | 5 | 6 | 7 | 8 |
|---|---|---|---|---|---|---|---|---|
| | Interactive Directory | | | | | | | |
| A | Name | First Name | Primary # | Second # | Home # | Mobile 1 # | Mobile 2 # | Status |
| B | Doe | John | ▮▮▮▮ | 765-4321 | 723-4567 | 888-1234 | 777-1234 | Busy |
| C | Doe | Jane | 555-1234 | 555-4321 | 800-8888 | 888-7654 | 777-9876 | ▮▮▮▮ |
| | | | | | | | | Return 8/18/97 |
| D | Duck | Duff | 666-1234 | 666-4321 | 555-1234 | 888-9876 | 777-7654 | ▮▮▮▮ |
| | | | | | | | | 011-65-555-1234 |
| | XXXX | XXX | XXX-XXXX | XXX-XXXX | XXX-XXXX | XXX-XXXX | XXX-XXXX | XXXXX |

Interactive Directory

| | 1 | 2 | 3 | 4 | 5 | 6 | 7 | 8 |
|---|---|---|---|---|---|---|---|---|
| | Name | First Name | Primary # | Second # | Home # | Mobile 1 # | Mobile 2 # | Status |
| A | Doe | John | ▬ | 765-4321 | 723-4567 | 888-1234 | 777-1234 | Busy |
| B | Doe | Jane | 555-1234 | 555-4321 | 800-8888 | 888-7654 | 777-9876 | ▬ |
| C | Duck | Duff | 666-1234 | 666-4321 | 555-1234 | 888-9876 | 777-7654 | Return 8/18/97 |
| D | xxxx | xxx | xxx-xxxx | xxx-xxxx | xxx-xxxx | xxx-xxxx | xxx-xxxx | ▬ |
| | | | | | | | | 011-65-555-1234 xxxxx |

REAL-TIME INTERACTIVE DIRECTORY

FIELD OF THE INVENTION

The present invention is in the field of computer integrated telephony and pertains more particularly to user-interactive software applications and systems.

BACKGROUND OF THE INVENTION

It is well known that much effort and energy is presently being devoted to development of telephony-related hardware and software. This development is driven largely by an ever-increasing demand for better and faster communication, and enabled in large part by advancements in computer science. In the telephony arts, for example, it is now common for telephony switches in public and private networks to be enhanced by connected computers in what is known as computer-telephony integration (CTI), wherein the connected computers run CTI applications of many sorts involved in monitoring and controlling telephony traffic.

It is also well known in the art that many organizations now employ call centers wherein agents of the organization occupy workstations equipped with telephones and computer stations. In many cases the computer stations in such a call center are interconnected via a local area network (LAN), and a CTI processor connected to the switching equipment at the call center may also connect on the same LAN, along with various other servers and processors. In such systems there may also be Internet and Intranet connections in almost any combination. Many such combinations are possible with regards to various network linking.

It is also well-known in the art that many individuals in the homes and both small and large businesses have both telephone service and network connected computers, such as personal computers at their workstations. A person at home with an Internet-connected computer and a telephone is at least potentially connected to millions of other telephones and computers throughout the world, including the stations of agents representing many companies.

In the highly interconnected computer and telephony world described above there is a need in many instances for real-time status information, and many systems are known to the inventor and in the art that assemble and provided such information. For example, in call centers, CTI servers and/or other servers network-connected to a CTI server in turn connected to telephony switching equipment, record and update status of the call center (agent availability, phones on-hook, off-hook, etc.). Such activity is often assembled and processed statistically for purposes of call-loading and routing decisions. Typically in a call center an agent at the beginning of a shift or session logs on and logs out at the end of a session. Data is kept relating employees to extension numbers at the call center, and so on.

As another example, call forwarding is a well-known function of many types of call-switching equipment, and remote call forwarding may be done. As still another example, there exists today technology whereby, in a network, it is known on the network when a station is on-line. On the Internet, there are commercially-available systems wherein on-line and off-line status is signaled between associated stations via a common server, which detects when a subscriber comes on line and reports the status to other subscribers.

With all of the existing interconnectivity of telephony equipment and computer equipment in the world, along with all of the status and statistical monitoring and reporting being done, very little to the present inventor' knowledge is done to effectively share the information over the interconnected systems. What is clearly needed is an interactive directory system adapted to find, access, and use status information.

SUMMARY OF THE INVENTION

In a preferred embodiment of the present invention an interactive directory system is provided, comprising a user interface displayable on a video monitor at a workstation and displaying at least one directory entity and a status for that entity; and comprising also a contact address for a computer having status information for the directory entity. The directory system contacts the computer at the contact address, accesses status information for the person or organization, and displays in the interactive directory updated status information for the directory entity. The status information displayed may at least one telephone number for the directory entity. In some embodiments the computer contacted for status information is the same computer upon which the interactive directory is executed, and in some embodiments the computer contacted is a statistical server (stat-server). The stat-server may be a stat-server in a call-center system. Also, the computer may be a workstation on the Internet, and may also be a CTI-server connected by a CTI link to a telephony switch connected to a telephony network, such as, but not limited to a public switched telephony network (PSTN).

In some embodiments multiple directory entities are listed, and multiple fields are provided associated with each entity for displaying alternative telephones and personal status for each directory entity listed. Individual ones of the telephone fields may be adapted to display indicia as well as a telephone number, the indicia representing status of telephones associated with the entity. In some embodiments the indicia include underlining, graphical field fill, reverse video, specific colors, check marks, specific fonts, bolding, italicizing, and scanned images, and wherein telephone status represented by specific indicia includes busy, not busy, best number, and temporarily disconnected. In some embodiments of the invention an interactive input associated with the directory entity, adapted for initiating by a user a telephone call to the directory entity is provided. In those embodiments with multiple entities there will be multiple interactive inputs associated with directory entities, and the interactive inputs provide for initiating a telephone call from an individual telephone field, the call being then placed to the telephone number in the telephone field.

To place a call by user input in one instance the workstation is connected to a telephone in turn connected to a telephone network, and the telephone call is initiated by the workstation dialing the telephone. In other instances the workstation places the telephone call by accessing a CTI-server connected on the network and also to a local telephony switch, and the CTI-server causes a call to be placed by the local telephony switch to the entity and for the same call to be connected to a telephone proximate the workstation.

It is not required in embodiments of the invention that status information for different entities be maintained at the same place. Status for individual entities may be maintained at a different computer for each entity, for example, and a contact address is associated at the workstation with each of the directory entities.

In various embodiments a status field is provided with alphanumeric display for displaying status for an entity, and the field may be used for displaying one or more of vacation status, one or more temporary telephone numbers, shift status, time status for change to a different number, and business travel status, for example.

The interactive directory in various embodiments of the present invention for the first time provides a way to track status of persons and organizational entities in such a way that information on the entities is always up-to-date and useful, and need not be updated laboriously by manual input. The invention is described below in a number of enabling embodiments.

BRIEF DESCRIPTION OF THE DRAWING FIGURES

FIG. 2 is an illustrative view of an interactive interface for a real-time interactive directory executing on a computer platform according to an embodiment of the present invention.

DESCRIPTION OF THE PREFERRED EMBODIMENTS

Figure 1:
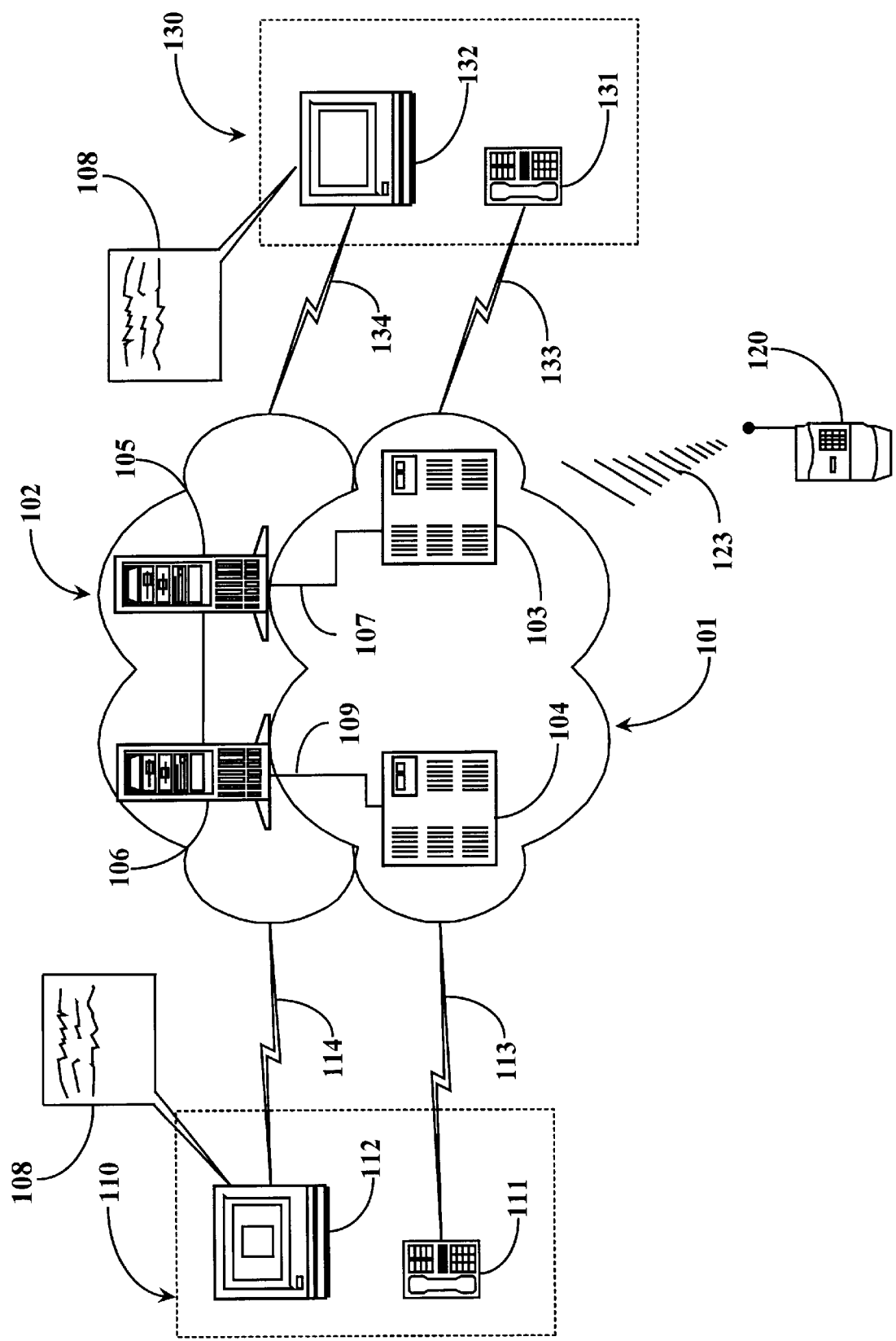
FIG. 1 is a largely diagrammatical overview of a CTI-enhanced computer-telephony environment according to an embodiment of the present invention.

FIG. 1 is an overview of a CTI-enhanced environment according to an embodiment of the present invention. A publicly switched telephone network (PSTN) represented by cloud 101 comprises a first telephony switch 104 and a second telephony switch 103. It will be clear to the skilled artisan that these two switches are merely exemplary of a large number of switches of various types that exist in any PSTN. PSTN 101 may also be a private telephone network or any other type of telephone network known in the art, including but not limited to such as Internet Protocol Telephony Networks (IPTN).

A wide area network (WAN) represented by cloud 102 may be the Internet or a large Intranet shared by one or more companies. WAN 102 may also be a combination of Intranet and the Internet. There are very many possible alterations as previously described above. For the purposes of the present example, cloud 102 represents the wide-area network known as the Internet.

Internet 102 is very large in scope and includes connections to equipment at many sites, providing Internet access and connectivity to a very large number of individuals at home, in small and large businesses, and to diverse organizations, including government entities.

Access to Internet 102 is provided by means of various methods known in the art, such as through dial-up connection to Internet Service Providers (ISPs). Typically, an individual having access to Internet 102 will have a computer (PC) with a modem for telephony connection to a provider access and a telephone for conventional telephone network access. Sometimes the computer may be served by a dedicated line, and in some instances a single line is shared (exclusively) for the telephone and the computer modem.

In the embodiment of FIG. 1 two workstations 110 and 130 are shown, and both are connected to PSTN 101 and Internet 102. Work station 110 comprises a PC 112 connected via link 114 to Internet 102. Link 114 may be of the form of analog, digital such as integrated services digital network (ISDN) or any other suitable connection known in the art. In this case, access to Internet 102 is achieved via dial-up connection to an ISP. Work station 110 also comprises a telephone 111 that is connected to PSTN 101 via plain old telephony service (POTS) line 113. Work station 130 comprises PC 132 connected to Internet 102 via link 134 and telephone 131 connected to PSTN 101 via POTS line 133.

The components present in workstation 130 may vary from the components present in workstation 110 without departing from the spirit and scope of the present invention. For example, either work station may have additional phone lines and or other equipment known in the art such as fax machines, additional PCs and the like. In this embodiment the elements shown in work station 110 are identical to elements shown in work station 130 for illustrative purposes only. In the case of an individual that is mobile as described previously, access to Internet 102 may be achieved via lap top computer with a modem connection or from a cellular phone with Internet access capability, and so on.

Telephony switch 104 is a switch in the PSTN local to station 110, and is a switch CTI-enhanced by a CTI server 106 connected to the switch by CTI link 109. Server 106 is Internet-connected, which in the diagram is implied by the fact of the server being shown in the Internet cloud. CTI server 105 is also Internet-connected and connected to telephony switch 103 via CTTI link 107. CTI servers 106 and 105 may be connected to each other via network connection as is known in the art, and are at least connected through the Internet. Telephony switches 104 and 103 are also connected to one another by virtue of being shown in the PSTN cloud. It will be apparent to the skilled artisan that there are many other situations of connectivity and much other equipment that could be shown. The inventor considers the diagram shown to be sufficient to illustrate a preferred embodiment of the present invention.

As was described above, there are many instances in the highly-interconnected computer and telephony world wherein real time status of equipment is monitored and information about availability and so on is stored. In the instance of FIG. 1, Internet-connected CTI server 105 monitors activity of switch 103, and may track the status of telephone 131 at station 130 (as well as the status of many other telephones that may connect through switch 103). Server 105 will always have real-time information of when line 133 is busy or available, and so on.

At station 110, PC 112 may be connected to the Internet through link 114. PC 112, then, may, given protocol to do so (URL and so forth) connect to server 105, and with authorization, which may be provided through a CTI application executed on server 105, may access the status of telephone 131 at station 130.

In a preferred embodiment of the present invention, a real-time interactive directory (RTID) application 108 is provided executing on PC 112 at station 110. RTID 108 is a system providing an interactive interface on a display of PC 112, which lists persons and organizations as entities, telephone access numbers where each person may be reached, and status of the person and numbers. In this embodiment entity identity and status are in well-known display fields, but could be displayed in other than specific fields, as is also well-known in the art.

FIG. 2 is an exemplary interactive interface for RTID 108 showing access and status for person entities John Doe, Jane Doe, and Duff Duck. Eight columns are shown providing last name, first name, primary telephone number, secondary telephone number, home number, mobile number #1, mobile number #2, and status. It will be apparent to those with skill in the art that many more items may be shown, and well known configuration techniques may be used to allow a user to choose which items to have displayed, and which items to have available by additional functions, such as by use of hot-keys, by scrolling and so on.

In this embodiment the directory may be accessed at station 110 while PC 112 is not connected to the Internet, and will serve in that instance as a static directory. RTID 108 is adapted preferably, however, to interact over a network connection, in this case the Internet, to gather and display real-time status, and in some embodiments to perform some other telephony functions, as will be described in more detail below.

Referring to FIG. 2, an interactive window provided by RTID application 108 executing on PC 110 is shown. A user at station may select a name among the list displayed, such as, for example, John Doe. The RTID has a look-up function that provides the remote source for real-time information for John Doe; in this case a CTI application running on server 105. The RTID accesses CTI server 105 over the Internet and negotiates for access to information on John Doe's status. When (and if) access is granted, status information on John Doe is passed over the Internet to PC 112 at station 110, and the information line on John Doe is immediately updated.

The information available at server 105 for John Doe may be as simple as whether telephone 131 is busy or open. There may, however, be more sophisticated information available. In some embodiments there may be facility provided for John Doe to update server 105 with a variety of information, and in a variety of ways. John Doe, may, for example, call in his status, indicate he will be available at a temporary number for a while, initiate call forwarding, which will be stored as status information on server 105, update telephone numbers, and the like. He may perform such data updating, which is additive to real-time monitoring information server 105 may glean via switch 103, and even other switches and servers in the network. John Doe may also update information via his PC 130, running an instance of RTID 108, which, in this instance, is adapted to provide an input interface with data fields, and to forward new information to the storage location listed for John Doe. John Doe may use a cellular telephone 120 to call in updated status and to de remote call forwarding and the like.

Given the instant teaching, it will be apparent to those with skill in the art that there are a number of ways status information may be obtained and stored. As other examples, status information for John Doe may be maintained on a server in the Internet perhaps remote from switch 103, and server 105 may periodically report status of telephones listed as John Doe telephones to that server. It will be apparent to the skilled artisan that, given the interconnectivity of the Internet and other networks, including public and privately switched telephony networks, that there is a very broad variety of ways status information on John Doe and his equipment may be maintained.

Returning now to PC 112 at station 110, when the information on John Doe is released, the fields in the interactive interface are immediately updated. There are a broad variety of ways information may be displayed to the user at station 110. In FIG. 2 the information on John Doe has been updated to indicate John Doe is busy (literal text in col. 8), and he is busy on his primary line (shown as video inverted). Other information may be shown as well. If the status check shows, for example, that John Doe is available for a call, the telephone for John Doe that is the proper phone to call may be indicated, such as by an underline, a color, a box around a number, and in many other ways.

In some embodiments, small characters or icons may represent the persons of interest, or even scanned-in pictures of people can be used, showing statuses by changing location, or color, or halo and so on.

In some embodiments all lines shown in the display of RTID 108 are updated all the time while PC 112 is Internet connected, and new lines, as a user scrolls to them, are also updated. The initiation for different entries may be done in a variety of ways without departing from the spirit and scope of the invention.

In the Background section above call centers were described, wherein organizations, typically for-profit companies, maintain agents at workstations having at least a telephone connected to telephone switching equipment. In many such systems there are distributed call centers with service control points in the telephony network. Switches in such systems are known to be enhanced by CTI servers, and agent status is quite often maintained by stat servers for purposes of call center system operations, such as routing calls. Such systems can be adapted to operate with the RTID system described above and elsewhere in this patent application.

Although not specifically shown in the example of FIG. 2, additional information, such as time zones, vacation temporary numbers, best times to call, gone but returning at, and so on may be shown. The RTID application as described above may also be interactive with respect to placing calls, sending E-mail, and using the Centrex functions of a telephony switch to access a forwarded number and so on. For example, the user at station 110 desiring to communicate with a name on the interactive list, upon seeing that the listing is available, and perhaps an indication of which number is best to make contact, may place the call by in input in the RTID, rather than by reaching for the telephone and dialing the selected number. Such dialers are known to the inventor, and may be integrated with the equipment at station 110.

If the user wants to contact Jane Doe and selects her name in the RTID list, then line C across would be updated in the interactive display. In this instance, Jane Doe is not available because she is on vacation (C8). IN some embodiments, by selecting field C8, an additional field may appear containing additional information such as a return date. If there is an individual replacing Jane Doe at her station, than the name of that individual may appear in fields C2 and C1. In the case of Duff Duck (line D), a forwarding number has been added to is itinerary because he is traveling.

When actual calls are placed by a user to a desired contact, several different methods may be employed to connect the call. For example, if the number clicked on by the user is an Internet phone, then the call would be routed over the Internet and appear on a destination PC as a ringing Icon. A field within the user's RTID application will reflect that the desired Internet phone number is active (the targets computer is Internet connected) and that it is not in use. In one embodiment, the user may use a separate telephone to call a forwarding number that is left in an Itinerary such as the traveling number shown for Duff Duck.

In another embodiment the RTID could be a directory implemented by a multinational company, including all of the telephony equipment of the company, for all employees of the company, and synchronized over the Internet. In yet another embodiment a system according to the invention may be implemented for a family, and perhaps close friends, with all of the data stored on a server connected to a local telephone company switch. Cell phones assigned to different members of the family could be displayed, as well as temporary locations and the like. Such a local family system would be very useful for family members to keep track of one another and maintain maximum communication.

In embodiments of the invention levels of access security may be implemented. For example, one associate may have full access to the itinerary and active states of another associate via password where as another associate may only access certain active states but not the itinerary and so on. Various security techniques that are known in the art could be employed such as encryption, password, etc.

It will be apparent to one with skill in the art that an RTID application of the present invention could be interfaced with existing routing applications and status reporting software without departing from the spirit and scope of the present invention. For example, an RTID may be interfaced with agent-reporting software thereby enhancing the method of agent real-time status reporting by making it viewable to the user instead of transparent to the user. Further enhancement is provided by allowing a user to use the RTD interface from a PC to initiate a communication.

It will further be apparent to those with skill in the art that there are many items of information and many sorts of information that may be accessed and presented on a real-time interactive directory according to embodiments of the present invention that are not shown in the embodiments above, but which will clearly fall within the spirit and scope of the invention. The directory, for example, might show the electronic schedule of a person called (in a meeting until three pm—would you like to book a call back?), the fact that the person may have used the phone already today, that the person mmay not have used the phone for a period of time, is busy talking to an internal colleague talking to an external colleague, that the person called is talking to a particular person or to a particular number, that the person is accepting urgent calls only, accepting calls from a limited list only, or has not answered (would you like to page him?).

Additionally the directory might include a time zone indicator, an off duty indicator, or a sleep period indicator. Other indications could be such as this person would prefer communications via email/telephone/fax/VON today. The directory might additional indicate information about other people associated with the called party: this person's following team mates have the following status:

Richard Pickering—admin assistant—western region sales—busy on external call
Greg Johnston—colleague—central region sales—free
Bruce Runyan—line manager—free There may also be messages returned from a called party customized for a caller/enquirer, such as
accepting calls from you/keen to talk to you; or
this person has a video phone/phone option which is above basic
voice and is compatible with yours.

In other instances the system may be configurable to permanently display the status of team colleagues, to notify when state changes 9 eg when phone next used or when accepting non urgent calls). Another feature may be reserving the next call into a telephone, via a call back request. Calls may be set up by switch other than originators or terminators switch in some instances. A system may also be configured to show geographical location of called person while roaming (eg from mobile phone data), and/or to provide status of IP Telephones (to non IP telephone users). Many other configurations and services will be apparent to those with skill in the art without departing from the spirit and scope of the invention.

It will also be apparent to one with skill in the art that the RTD application interface running on a users PC can be presented in various configurations that are friendly to the user. For example, icons may be used to represent contacts, places, events and so on. Varying color backgrounds may be used to highlight important information or current status states. For example, a busy phone number may be highlighted in red where as an attempted call may result in a highlight of blue and so on. Further, many additional states of communication that are utilized in a network could be incorporated into the RTID application of the present invention such as multimedia applications involving video conferencing, video phone E-mail and other known programs. There are many other embodiments possible, many of which have already been described above. The invention is limited only by the claims which follow.

What is claimed is:

1. An interactive directory system, comprising:
    a user interface displayable on a video monitor at a workstation and displaying at least one directory entity and a status for that entity; and
    a contact address for a computer having status information for the directory entity;
    wherein the directory system contacts the computer at the contact address, accesses status information for the directory entity, and displays in the interactive directory updated status information for the directory entity.

2. The directory system of claim 1 wherein the status information displayed includes at least one telephone number for the directory entity.

3. The directory system of claim 1 wherein the computer contacted for status information is the same computer upon which the interactive directory is executed.

4. The directory system of claim 1 wherein the computer contacted is a statistical server (stat-server).

5. The directory system of claim 4, wherein the stat-server is in a call-center system.

6. The directory system of claim 1, wherein the computer is a workstation on the Internet.

7. The directory system of claim 1 wherein the computer is an Internet-connected server and also a CTI-server connected by a CTI link to a telephony switch connected to a telephony network.

8. The directory system of claim 7 wherein the telephony network is a public switched telephony network (PSTN).

9. The directory system of claim 1 wherein multiple directory entities are listed, and wherein multiple fields are provided associated with each entity for displaying alternative telephones and personal status for each directory entity listed.

10. The directory system of claim 9 wherein individual ones of the telephone fields are adapted to display indicia as well as a telephone number, the indicia representing status of telephones associated with the entity.

11. The directory system of claim 10 wherein the indicia include underlining, graphical field fill, reverse video, specific colors, check marks, specific fonts, bolding, italicizing, and scanned images, and wherein telephone status represented by specific indicia includes busy, not busy, best number, and temporarily disconnected.

12. The directory system of claim 9 further comprising interactive inputs associated with directory entities and wherein the interactive inputs provide for initiating a telephone call from an individual telephone field, the call being then placed to the telephone number in the telephone field.

13. The directory system of claim 9 comprising individual contact addresses for individual directory entities, and wherein status updates are made for different listed directory entities from different computers.

14. The directory system of claim 1 further comprising an interactive input associated with the directory entity, adapted for initiating by a user a telephone call to the directory entity.

15. The directory system of claim 14 wherein the computer is a workstation, and wherein said workstation is connected to a telephone in turn connected to a telephone network, and wherein the telephone call is initiated by the workstation dialing the telephone.

16. The directory system of claim 14 wherein the computer is a workstation, and wherein said workstation places the telephone call by accessing a CTI-server connected on the network and also to a local telephony switch, and the CTI-server causes a call to be placed by the local telephony switch to the entity and for the same call to be connected to a telephone proximate the workstation.

17. The directory system of claim 1 comprising a status field other than a telephone field associated with a directory entity, the status field adapted for alphanumeric display.

18. The system of claim 17 wherein the status field other than a telephony field is adapted to display one or more of vacation status, one or more temporary telephone numbers, shift status, time status for change to a different number, and business travel status.

19. A method for tracking status of personal and organizational entities, comprising steps of:
(a) displaying an interactive directory on a video monitor of a workstation, the interactive directory providing entity identity and status;
(b) causing the workstation to contact a computer having status information for an entity listed in the directory, a contact address for the computer being prestored at the workstation and associated with the entity;
(c) accessing status information for the entity associated with the contact address; and
(d) using the accessed information to update and display status for the entity in the interactive directory.

20. The method of claim 19 wherein in step (d) the status information displayed includes at least one telephone number for the directory entity.

21. The method of claim 19 wherein in step (b) the computer contacted for status information is the same computer upon which the interactive directory is executed.

22. The method of claim 19 wherein in step (b) the computer contacted is a statistical server (stat-server).

23. The method of claim 22, wherein the stat-server is in a call-center system.

24. The method of claim 19, wherein the computer contacted in step (b) is a workstation on the Internet.

25. The method of claim 19 wherein the computer contacted in step (b) is an Internet-connected server and also a CTI-server connected by a CTI link to a telephony switch connected to a telephony network.

26. The method of claim 25 wherein the telephony network is a public switched telephony network (PSTN).

27. The method of claim 19 wherein multiple directory entities are listed, and wherein multiple fields are provided associated with each entity for displaying alternative telephones and personal status for each directory entity listed.

28. The method of claim 27 wherein individual ones of the telephone fields are adapted to display indicia as well as a telephone number, the indicia representing status of telephones associated with the entity.

29. The method of claim 28 wherein the indicia include underlining, graphical field fill, reverse video, specific colors, check marks, specific fonts, bolding, italicizing, and scanned images, and wherein telephone status represented by specific indicia includes busy, not busy, best number, and temporarily disconnected.

30. The method of claim 27 further comprising a step for using interactive inputs associated with directory entities to place telephone calls, and wherein the interactive inputs provide for initiating a telephone call from an individual telephone field, the call being then placed to the telephone number in the telephone field.

31. The method of claim 30 wherein the workstation places the telephone call by accessing a CTI-server connected on the network and also to a local telephony switch, and the CTI-server causes a call to be placed by the local telephony switch to the entity and for the same call to be connected to a telephone proximate the workstation.

32. The method of claim 27 comprising individual contact addresses for individual directory entities, and wherein status updates are made for different listed directory entities from different computers.

33. The method of claim 19 further comprising a step for using an interactive input associated with the directory entity for placing a telephone call to the directory entity.

34. The method of claim 33 wherein the workstation is connected to a telephone in turn connected to a telephone network, and wherein the telephone call is initiated by the workstation dialing the telephone.

35. The method of claim 19 comprising a status field other than a telephone field associated with a directory entity, the status field adapted for alphanumeric display.

36. The system of claim 35 wherein the status field other than a telephony field is adapted to display one or more of vacation status, one or more temporary telephone numbers, shift status, time status for change to a different number, and business travel status.

* * * * *